(12) United States Patent
Lundborg (10) Patent No.: US 6,434,386 B1
(45) Date of Patent: Aug. 13, 2002

(54) METHOD AND SYSTEM FOR MONITORING POWER OUTPUT IN TRANSCEIVERS

(75) Inventor: Tomas Lundborg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/223,633

(22) Filed: Dec. 31, 1998

(51) Int. Cl.$^7$ .............................. H04Q 7/20; H04B 1/00
(52) U.S. Cl. ........................ 455/436; 455/69; 455/439
(58) Field of Search ................................ 455/436, 522, 455/437, 434, 439, 442, 69, 70; 370/331, 332, 335, 330

(56) References Cited

U.S. PATENT DOCUMENTS

| | | | |
|---|---|---|---|
| 4,613,990 A | 9/1986 | Halpern | 455/522 |
| 5,117,502 A | 5/1992 | Onoda et al. | 455/437 |
| 5,491,837 A | 2/1996 | Haartsen | 455/62 |
| 5,542,097 A | 7/1996 | Ward et al. | 455/437 |
| 5,551,057 A | 8/1996 | Mitra | 455/522 |
| 5,570,352 A | 10/1996 | Poyhonen | 370/330 |
| 5,678,185 A | 10/1997 | Chia | 455/437 |
| 5,771,451 A | 6/1998 | Takai et al. | 455/442 |
| 5,774,809 A | 6/1998 | Tuutijarvi et al. | 455/437 |
| 5,799,005 A | 8/1998 | Soliman | 370/335 |
| 5,845,208 A | * 12/1998 | Hottinen | 455/422 |
| 5,862,489 A | * 1/1999 | Aalto | 455/522 |
| 5,875,399 A | 2/1999 | Kallin et al. | 455/434 |
| 5,911,122 A | * 6/1999 | Corriveau et al. | 455/432 |
| 5,970,407 A | * 10/1999 | Brunner et al. | 455/437 |
| 5,978,675 A | * 11/1999 | Niemela | 455/423 |
| 6,018,650 A | 1/2000 | Petsko et al. | 455/234.1 |
| 6,131,049 A | * 10/2000 | Marsan et al. | 455/574 |
| 6,161,015 A | * 12/2000 | Birchler et al. | 455/440 |

FOREIGN PATENT DOCUMENTS

| | | | |
|---|---|---|---|
| WO | 92/17953 | 10/1992 | H04J/3/16 |
| WO | WO97/34439 | 9/1997 | |
| WO | WO98/56120 | 12/1998 | |

* cited by examiner

*Primary Examiner*—Vivian Chin
*Assistant Examiner*—Charles N. Appiah
(74) *Attorney, Agent, or Firm*—Burns, Doane, Swecker & Mathis, L.L.P.

(57) ABSTRACT

A method and system for monitoring output power of transceivers in radiocommunication systems are described. By evaluating a statistic associated with pre- and post handoff received signals, information can be gathered regarding the transmit power operating characteristic of various transceivers. For example, by measuring the received signal strength of a neighboring base station's control channel prior to handoff and comparing that with the received signal strength of a traffic channel transmitted by the same base station after handoff, the system can acquire information regarding the power output of a base station transceiver. Over time, the system can determine whether one or more power settings associated with that transceiver needs adjustment.

23 Claims, 5 Drawing Sheets

| DEVICE | DELTA | DELTA$_{COMP}$ |
|---|---|---|
| 1 (MEAS. CH) | 0 | 0 |
| 2 (DVC) | 0 | 0 |
| 3 (DVC) | 2 | 2 |
| 4 (DVC) | -8 | -8 |
| 5 (DVC) | 1 | 1 |

Fig. 4

| DEVICE | DELTA | DELTA$_{COMP}$ |
|---|---|---|
| 1 (MEAS. CH) | 0 | 0 |
| 2 (DVC) | -7 | 0 |
| 3 (DVC) | -7 | 0 |
| 4 (DVC) | -10 | -3 |
| 5 (DVC) | -7 | 0 |

METHOD AND SYSTEM FOR MONITORING POWER OUTPUT IN TRANSCEIVERS

BACKGROUND

The present invention relates generally to methods and systems for radiocommunications and, more particularly, to such systems in which communication quality is monitored and connections can be handed over from one channel or base station to another based on monitored quality.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In cellular systems, the capability is typically provided to transfer handling of a connection between, for example, a mobile station and a serving base station to another, neighboring base station, as the mobile station changes its position and so moves out of the coverage area of one base station and into the coverage area of another base station. This type of handoff is commonly referred to as an "intercell" handoff as the coverage areas associated with base stations are commonly referred to as "cells". Depending upon the quality of the current channel, it may also be desirable to transfer a connection from one channel of the base station to another channel supported by the same base station, which handoffs are commonly referred to as "intracell" handoffs.

To smoothly complete a handoff, the network controlling the base stations first determines, for each mobile station, whether the need for handoff from its currently serving base station is imminent and secondly determines to which new base station (or channel) handoff should be effected. In making the former decision, the radiocommunication system monitors the quality of the mobile station's current connection. In making the latter decision it is desirable that the network controller know either how well each neighboring base station can receive signals from a mobile station in question, how well the mobile station in question can receive signals from each neighboring base station, or both. Monitoring signalling associated with a serving base station and neighboring base stations typically involves making signal strength measurements, which measurements can be made in a variety of ways depending, for example, on the type of access methodology employed by the radiocommunication system.

Many existing radiocommunication systems are based on an access method known as Frequency Division Multiple Access (FDMA), in which each mobile station transmits on a unique frequency within its current base station area. The mobile station is thus unaware of signals on other frequencies from surrounding base stations. In FDMA systems it is typically considered too costly to equip mobile stations with an extra receiver that could be used to scan other base station frequencies to determine their received signal strength. Instead, it is common for base stations to be equipped with a scanning receiver that searches for the signals of approaching mobile stations. When the base stations scan for the signal strength of mobile stations, the method could be termed base assisted handover (BAHO). The network then hands over a mobile station from a base station covering an area that the mobile is leaving to the base station that reports the best reception of the mobile station's signal.

More recent cellular telephone standards employ Time Division Multiple Access (TDMA) in which a fixed time period (e.g., 20 mS) on each pair of radio frequency links (one used in the direction from mobile station to base station (uplink), the other used in the direction from base station to mobile station (downlink)) is divided into a number (e.g., 3) of short timeslots (e.g., 6.6 mS) that are cyclically used by different mobile stations. Thus, a first mobile station transmits in the first timeslot in each period, a second mobile station transmits in the second timeslot in each period and so on. Likewise the base station transmits to one mobile station in the first timeslot, another mobile station in the second slot and so on. By offsetting the allocation of timeslots in the two communication directions, base to mobile (the downlink) and mobile to base (the uplink), it can be arranged that a first mobile transmits in the first timeslot and receives in the second timeslot; a second mobile transmits in the second timeslot and receives in the third, while a third mobile transmits in the third timeslot and receives in the first timeslot. An advantage of this arrangement is that a mobile station does not need to transmit and receive simultaneously, which reduces disturbance.

In the above three-timeslot example, each mobile station is active to transmit or receive in two of the three timeslots and is idle in the remaining timeslot. Therefore it is possible for TDMA mobile stations to use this idle time to receive signals from other base stations and measure their signal strength. Typically, such measurements are made on the control channels (or some type of other measurement channel) being broadcast by these base stations, rather than the traffic channels used to support circuit-switched or packet-switched connections.

By reporting these signal strength measurements to the base station using a slow speed data channel multiplexed with the traffic (e.g., voice), the network is informed about the base stations each mobile station can receive. The network can use this information to effect handoff to the preferred base station, and such a method is termed mobile assisted handover (MAHO). For example, the system can compare the measured signal strengths associated with neighboring base stations to the signal strength at which the mobile station is receiving transmissions from its serving base station. If a neighboring base station is received at a sufficiently higher signal strength (e.g., employing a hysteresis value to avoid a "ping-pong" handoff effect at cell borders), than the serving base station, then a handoff is performed. Systems providing MAHO can also have access to the base station measurements, and so are able to effect smoother and more reliable handovers because both uplink and downlink signal strengths are taken into account, instead of just uplink strengths in the case of BAHO.

In yet another access technique, Code Division Multiple Access (CDMA), mobile stations can share the same frequency band but communications are distinguishable by virtue of unique spreading codes. Even in CDMA systems it is possible to measure a signal strength of pilot channels associated with a particular base station. The base station and/or mobile station can use this information to determine when a handover to another code, or another frequency band in multicarrier CDMA, is desirable.

As can be seen from the foregoing, a common element in determining when a handoff is desirable involves the measurement and comparison of received signal strengths, and in particular measurements made on control channels of various neighboring base stations. However, there are several complicating factors relating to the output transmit powers of the transceivers within base stations which reduce the accuracy of conventional handoff algorithms.

The actual output transmit power of a particular transceiver can vary from transceiver to transceiver within a base station for a number of different reasons. For example, problems or changes to components within a transceiver may cause its actual output transmit power to vary from an intended value. Other factors which may cause variances in actual output transmit power between transceivers involve different power settings which are intended to permit, for example, a network operator to have greater control over system operation.

For example, control channels and traffic channels are not always transmitted by base stations using the same transmit power. In some systems it is possible to transmit control channels at a higher power level than traffic channels in the same cell to ensure that the control information contained in the control channels will be accurately received by the potentially large number of mobile stations that are listening thereto. To enable, for example, a network operator, to control a transmit power difference between control channels and traffic channels a power setting for traffic channels (PSVB) and a power setting for measurement channels (PSMB) can be provided. These two settings can also be combined into one differential power setting, e.g., PSVB-PSMB. The PSVB and PSMB power settings (or differential power setting) are stored in the mobile switching centers (MSCs) of radiocommunication systems for each base station, which base station typically includes a plurality of transceiver devices.

In addition to the PSVB/PSMB power settings, network operators can also set the basic output power of each transceiver device individually. Like the PSVB/PSMB power settings, these individual transceiver power settings can also be stored in the MSC.

From the foregoing, it will be apparent to those skilled in the art that the actual output transmit power of the transceiver devices may vary from an intended output transmit power for many reasons. The PSVB/PSMB setting for a base station may be incorrect. The individual transceiver power setting may be incorrect. One or more of the components involved in the transmit path of the transceiver may be malfunctioning, or any combination of these things could occur. Under any of these scenarios, the system may perceive a neighboring base station as being a better server for a particular mobile station when, in fact, its current serving base station is still superior or vice versa.

For example, assume that a neighboring base station is selected as a better server due (at least in part) to the strength at which its control channel is received by a mobile station. Then, when the mobile station is assigned to a traffic channel that is transmitted using a different transceiver, the mobile station actually receives a relatively weak signal because the traffic channel transceiver is transmitting at a much lower power level than expected, e.g., due to a fault in the transceiver, because the PSVB/PSMB setting(s) is incorrect, and/or because the individual power setting of that transceiver has been set incorrectly. If this occurs, then measurements taken subsequent to the handoff will indicate that a different base station is the best server and the mobile will be handed off again, which results in poor call quality and is an inefficient use of resources. Conventionally, these problems associated variances between intended output transmit powers and actual output transmit powers of transceivers have been addressed empirically, i.e., generally by operators manually observing cell performance.

Accordingly, there is a need to develop enhanced techniques to monitor power outputs and power settings of transceivers in radiocommunication systems more accurately, so that processes, such as handoff, can be performed in an efficient way to avoid oscillating connections caused by the "ping-pong" effect described above.

SUMMARY

These, and other, problems, drawbacks, and limitations of conventional output power monitoring techniques, are overcome according to the present invention in which exemplary embodiments provide for a comparison between the signal strength of the measurement channel of a candidate base station and the signal strength of the traffic channel associated with that measurement channel. More specifically, the mobile station can measure the signal strength of the candidate base station prior to handoff and report that signal strength to its current base station. The base station can report the signal strength of the measurement channel to the MSC in the handoff request. Then, when the mobile station is handed off to a traffic channel associated with the new serving base station, i.e., based upon the earlier reported measurement channel's signal strength, the signal strength of the traffic channel will also be reported by the mobile station and forwarded to the MSC. The system can then create a statistic which tracks the difference between the measured control channel signal strength and the measured traffic channel signal strength, which statistic can then be used to either manually or automatically adjust the output power of a transceiver, a power setting, or both.

Alternatively, the statistic can be generated by measuring a received signal strength of the mobile station's original traffic channel prior to handoff and a received signal strength of the mobile station's new traffic channel after a handoff. These signal strengths are compared in the system to identify output power variances.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary details.

Figure 1:
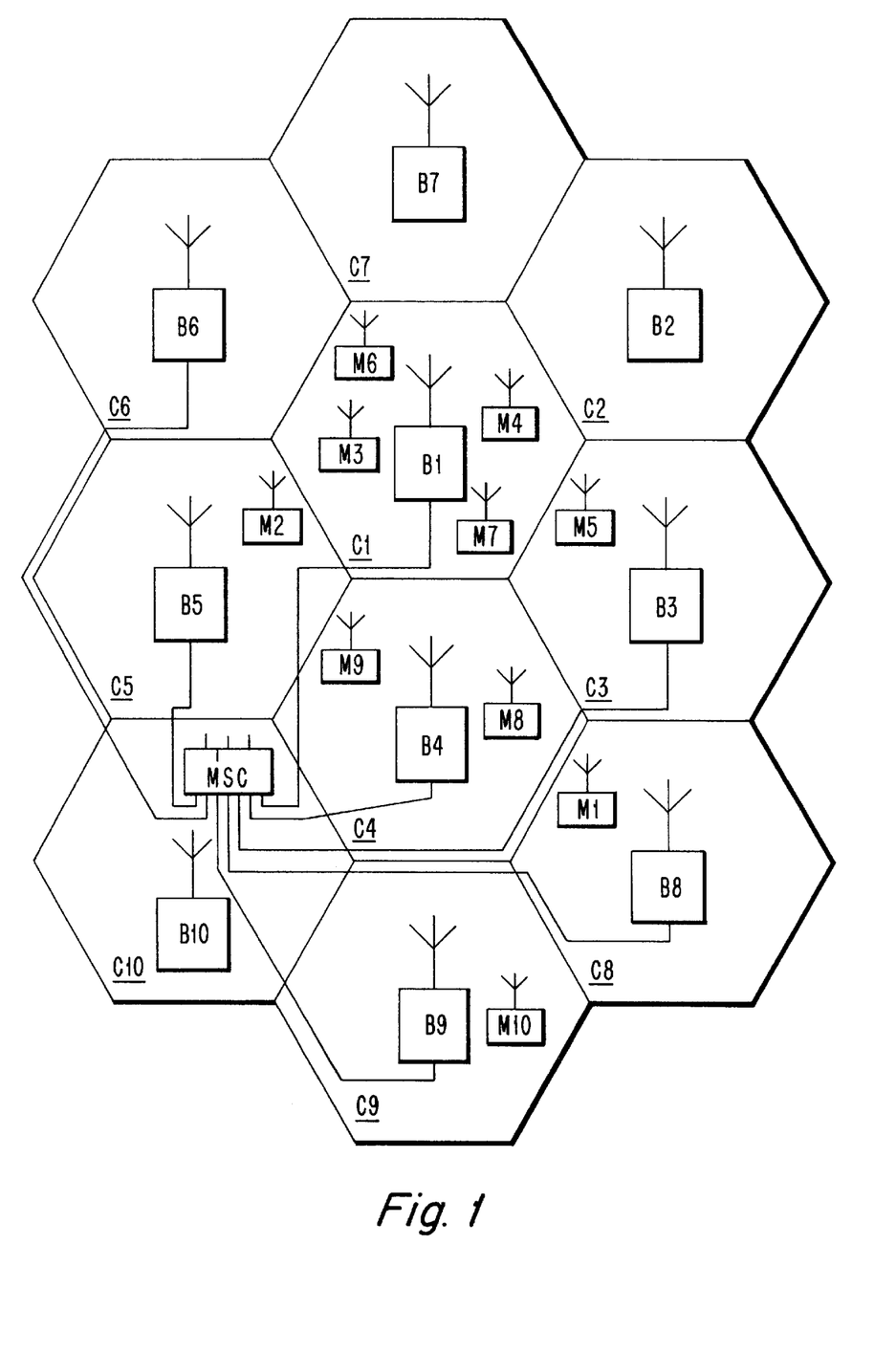
FIG. 1 illustrates an exemplary cellular radiocommunication system.

Prior to describing the details of the present invention, an example of the construction of a cellular mobile radio system in which the present invention can be used is illustrated in FIG. 1. FIG. 1 is a schematic diagram illustrating ten cells, C1 to C10. Normally, systems and methods according to the present invention would be implemented in a system comprising many more cells than ten. For the purposes of this description, however, the system depicted in FIG. 1 is considered to be an isolated region of a larger system.

For each cell C1 to C10, there is a respective base station B1 to B10. The exemplary embodiment illustrated in FIG. 1 shows base stations situated in the vicinity of respective cell centers and having omni-directional antennas. Those skilled in the art will readily appreciate that the base stations may be located in other areas of the cells and have other types of antennas, for example, in the vicinity of cell borders and having directional sector antennas or array antennas.

FIG. 1 also illustrates ten mobile stations M1 to M10, which are movable within a cell and from one cell to another cell. Again, methods and systems according to the present invention can be practiced with more or less than ten mobile stations.

Also illustrated in FIG. 1 is a mobile switching center (MSC). The MSC is connected to all ten base stations by cables (not all shown) and to a fixed public switching telephone network (PSTN, not shown) or similar network. The MSC routes calls to and from the base stations and coordinates the activities of the system.

Cellular systems are assigned to a particular frequency band over which they can operate. This frequency band is allocated in units called channels to the cells in a particular area. Different access methodologies, e.g., frequency division multiple access (FDMA), time division multiple access (TDMA), code division multiple access (CDMA), and hybrids thereof, renders the meaning of what constitutes a "channel" to be different from system to system, as will be appreciated by those skilled in the art.

Nonetheless, as discussed above, the efficient use of the frequency spectrum is an important consideration in maximizing system capacity. Thus, it is not surprising that a number of different methodologies have been adopted for allocating channels to the various cells and, more particularly, to assigning a channel for new connections occurring within each cell. Some of these methodologies allocate fixed sets of channels to each cell, while others allocate channels dynamically based on traffic densities and/or interference situations. In all of these methodologies, however, the system generally provides the capability to change channels when signal quality degrades to an unacceptable degree.

For example, the system may determine that a handoff is needed based on periodic measurements of signal strength (and possibly other connection parameters) associated with the connection between the mobile station and its current serving base station. These measurements are typically reported to the system periodically by way of channel quality measurements (CQMs) transmitted by the mobile station to the base station.

In one exemplary embodiment handoff decisions are made based on downlink signal strength of the serving ($SS_{SERV}$) and the target ($SS_{TARG}$) base stations as measured by the mobile station and reported to the land system, for example using the conventional Mobile Assisted Handoff (MAHO) function mentioned above. Using the MAHO function, a mobile station may be ordered by the system to measure and report signal strength (and possibly other) parameters associated with the signal transmitted by the base station to which it is connected, as well parameters associated with signals transmitted by one or more target (also referred to as "candidate") base stations.

Figure 2:
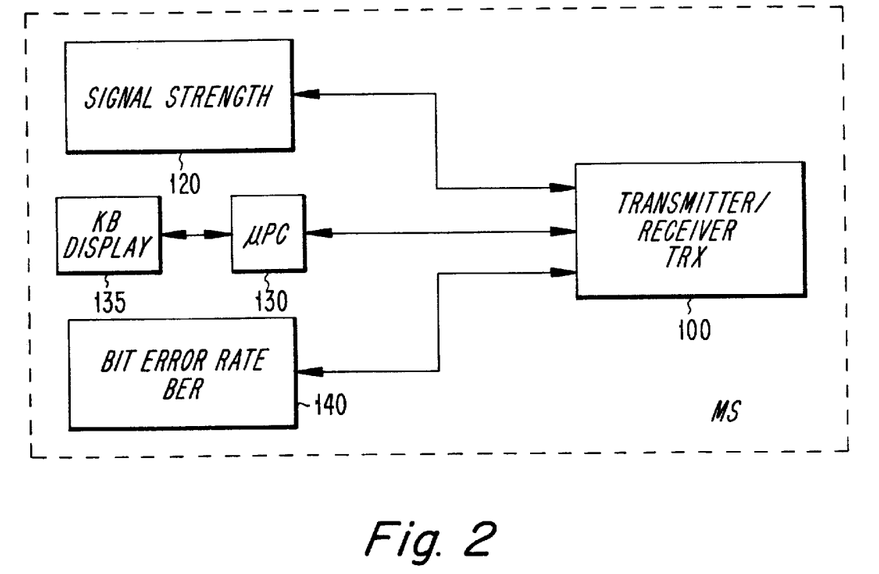
FIG. 2 is a block diagram representation of an exemplary mobile station which can be used to implement the present invention.

An exemplary embodiment of a mobile station which can operate to perform MAHO measurements is illustrated in FIG. 2. This block diagram has been simplified to illustrate only those components relevant to the measurement of downlink signal strength, however those skilled in the art will be well aware of the other major functional blocks associated with mobile stations. In FIG. 2, incoming radio signals are received by transmitter/receiver TRX 100. The timing is synchronized to the received symbol sequence by microprocessor controller 130. The strength of the received signals are measured by a signal strength measuring part 120, the value of which is then passed to microprocessor controller 130. The bit error rate (BER) of the received signal can also be determined as an indication of received signal quality as reflected by block 140. The mobile station will also have input/output devices, such as a keyboard and display 135, as well as a microphone and speaker unit (not shown), which enables information to be exchanged between the mobile station and the base station.

When the mobile station receives a list of channel numbers and/or frequencies in a MAHO command, it will sequentially tune to each identified channel/frequency during one or more measurement intervals. For example, in a TDMA system the measurement intervals may be provided during idle time slots, i.e., during time slots when the mobile station is not transmitting or receiving over its currently assigned traffic channel. Once the mobile station has made the requested measurements, it will report them to the system which will then evaluate the various target base stations using a handoff algorithm. Although simplified for the purposes of better illustrating the present invention, handoff algorithms according to the present invention can be represented as:

$$SS_{TARG} > SS_{SERV} + \text{Hyst} \qquad (1)$$

where: Hyst is a hysteresis value which is added to the signal strength of the serving base station to avoid oscillating handoffs. When the inequality is true, then a handoff is justified to the target base station. Otherwise, the system evaluates any other target base stations or maintains the current connection. Of course those skilled in the art will appreciate that other factors, e.g., service availability, macro/microcell preference, etc. may also be considered in the handoff algorithm.

Figure 3:
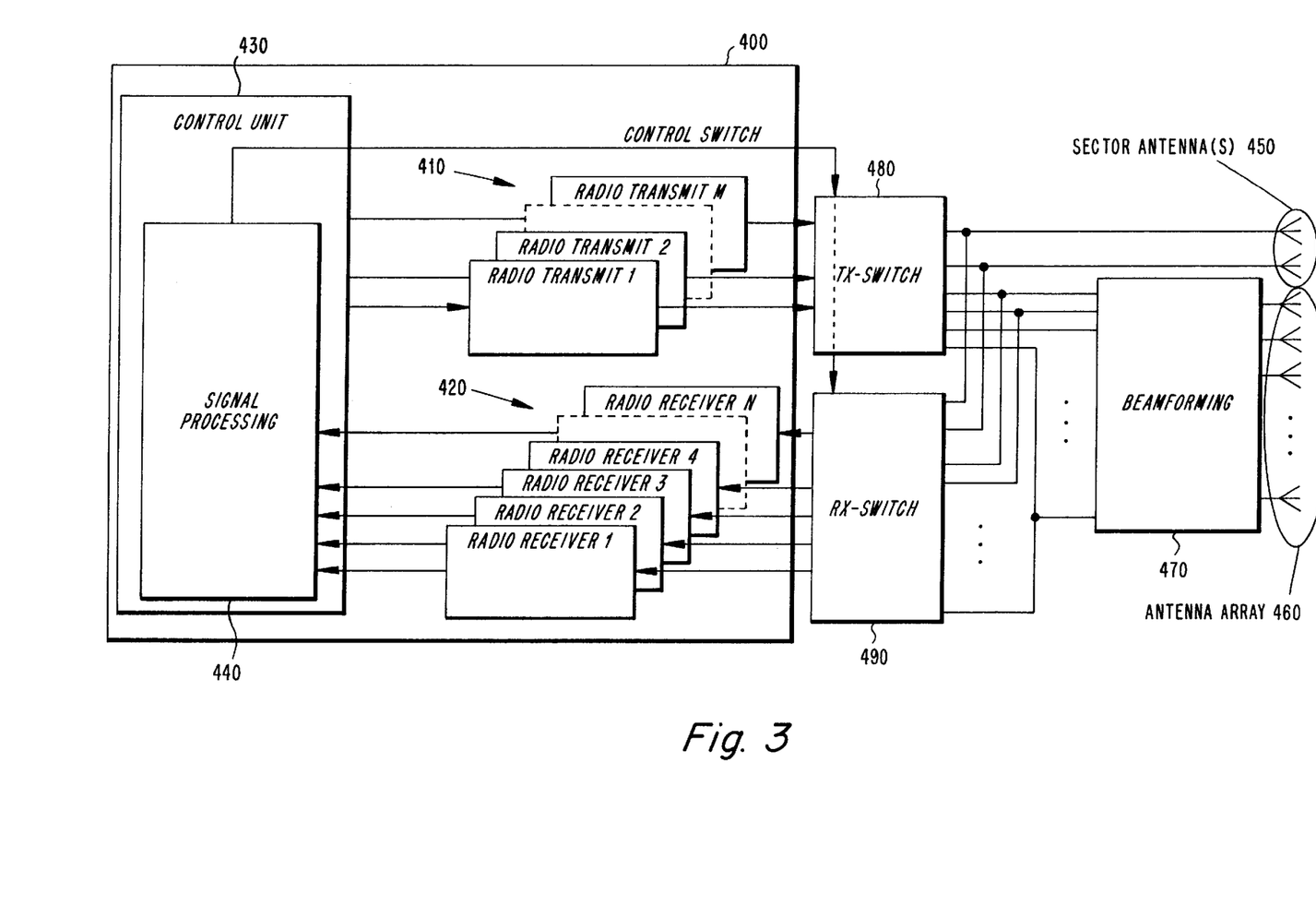
FIG. 3 is a block diagram of a base station including a number of transceiver units whose power can be monitored according to exemplary embodiments of the present invention.

FIG. 3 illustrates a transceiver unit 400 which can be used, for example, as one of the cellular base stations B1 ... B10 illustrated in FIG. 1. Therein, a plurality of radio transmitters 410 and radio receivers 420 are provided, each of which is adapted to handle an independent carrier frequency. These devices can be designed according to well known techniques, e.g., transmitters 410 may include amplifiers, upconverters, filters, analog-to-digital converters, etc. and receivers 420 may1 include amplifiers, downconverters, filters, digital-to-analog converters, etc. These devices are controlled by, and pass information to and from, control unit 430 which includes a central processing unit (not shown), memory (not shown) and a signal processing device 440. Signal processing device 440 provides the necessary software functionality for processing both signals to be transmitted and signals that are received via transmitters 410 and receivers 420, respectively. For example, signal processing unit 440 can provide the signal encoding, modulation, scrambling and channel filtering functions, etc. for transmitted signals which may be necessary depending upon the channel configuration (e.g., access methodology, bandwidth, etc.) as will be appreciated by those skilled in the art. Likewise, signal processing circuitry 440 can also perform channel filtering, demodulation, decoding and descrambling tasks on received signals.

The signal processing device 440 can be implemented, according to exemplary embodiments of the present invention, using a flexible ASIC approach which allows the signal processing functions to be selectively changed to accommodate the antenna arrangement and signal processing desired by the network operator. The transceiver unit 400 may have any number and type of antenna arrangement connected thereto. However, for the purposes of illustrating the present invention, transceiver unit 400 is connected to two directional sector antennas 450 and an antenna array 460 having N antenna lobes or elements. The antenna array 460 is supported by beamforming unit 470, which shapes and steers the plurality of beams to achieve a desired coverage area. The beamforming unit 470 can comprise any conventional fixed beamformer, such as a Butler matrix. As illustrated in FIG. 3, each of the sector antennas 450 and each element of the antenna array 460 can be connected to one or more respective radio transmitter(s) 410 and radio receiver(s) 420 through transmit switch 480 and receive switch 490, respectively. The switches 480 and 490 are used by the transceiver to selectively assign resources to various connections under the supervision of control unit 430. For more information regarding transceivers of this exemplary type, the interested reader is referred to U.S. patent application Ser. No. 09/053,951 entitled "Method and System for Handling Radio Signals in a Radio Base Station", by Henrik Dam et al., filed on Apr. 3, 1998, the disclosure of which is incorporated here by reference.

Radio base stations such as those illustrated in FIG. 3 provide significant flexibility in operation. For example, the sector antennas 450 and antenna array 460 can be used to propagate different types of signals/channels to support radiocommunication service. In such an exemplary application, it may be desirable to have different values for PSVB and PSMB which introduces more possibility for output power anomalies and more reason to introduce a power monitoring scheme as will now be described.

To better understand techniques for monitoring and controlling power settings and output transmit power according to exemplary embodiments of the present invention a specific, yet still illustrative, example will now be provided wherein a mobile station M5 in FIG. 1 has recently moved such that the system's handoff algorithm has determined that a handoff is necessary from its current serving base station, e.g., base station B1, to a target base station, e.g., base station B3. For the purposes of this example, the following different measurement variables are defined:

$Ss_t(B1)$ is the signal strength measured by mobile station M5 on its traffic channel with base station B1 prior to handoff;

$Ss_c(B1)$ is the signal strength measured by mobile station M5 on a control channel (or measurement channel) transmitted by base station B1;

$Ss_t(B3)$ is the signal strength measured by mobile station M5 on its new traffic channel with base station B3 after the handoff;

$Ss_c(B3)$ is the signal strength measured by mobile station M5 on a control channel (or measurement channel) transmitted by base station B3.

According to exemplary embodiments of the present invention, the system monitors and controls power outputs and power settings of base station transceivers by creating statistics associated with mobile station's measurements before and after handoff. For example, using the variables defined above, the system can create a statistic, $Ss_d$ (referred to herein as the "delta statistic"), by comparing the signal strength measured on the new base station's traffic channel after handoff $Ss_t(B3)$ with the signal strength measured before the handoff on the control (measurement) channel of the new base station $Ss_c(B3)$. For this particular handoff in this particular exemplary embodiment, the statistic can be calculated as:

$$Ss_d = Ss_t(B3) - Ss_c(B3) \quad (2)$$

According to the present invention, this statistic can be tracked by, for example, calculating the mean of the difference over a number of occurrences, i.e.,:

$$\text{delta} = \Sigma SS_d / n \quad (3)$$

where n is the number of differences which are reported.

After the mean value has been taken for a statistically significant number of delta statistic calculations, one would expect this value to approach PSVB-PSMB. A variance from this expected value can be detected by the system. Then, the system (and/or the operator) will know that there is a problem associated with the output transmit power of that transceiver. For example, the power setting stored in the MSC for that particular transceiver may be incorrect. If several of the transceivers show a discrepancy, then the PSVB/PSMB setting may be stored incorrectly. This recognition will permit the system and/or the network operator to adjust output transmit powers in an appropriate direction. Of course those skilled in the art will appreciate that the actual calculation used to compare the signal strengths can vary and yet still provide the operator and/or system with the desired information for power monitoring. For example, an alternative is to calculate the delta statistic including the PSVB-PSMB information, e.g., by calculating:

$$Ss_d = Ss_t(B3) - Ss_c(B3) - (PSVB-PSMB) \quad (4)$$

for the example provided above.

Figure 4:
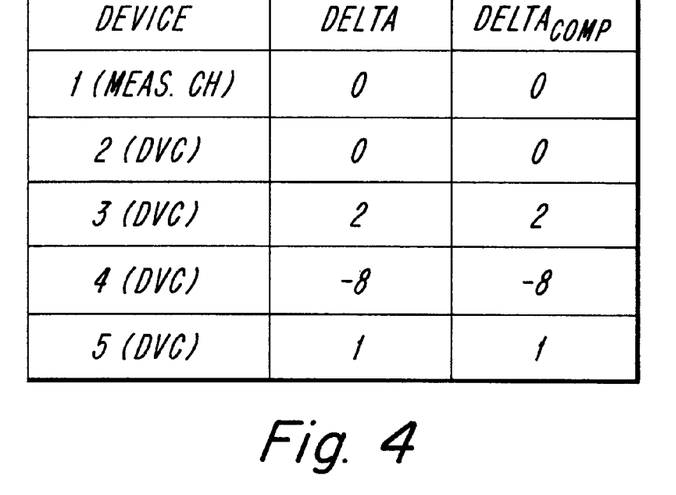
FIGS. 4 and 5 are tables including exemplary accumulated delta statistics according to exemplary embodiments of the present invention.

Consider the exemplary delta statistics compiled as illustrated in FIG. 4. Therein, the delta statistic has been accumulated for five different devices, i.e., transceivers, associated with a particular cell or base station. The middle column represents the delta statistic as computed using equation (2) and the rightmost column (delta$_{comp}$) represents the delta statistic as computed using equation (4). These exemplary values represent the mean (or median) delta statistic taken over a period of time that is sufficient to make the delta information statistically reliable, e.g., more than about 400 reported values.

For this example, PSVB-PSMB is equal to zero, such that both columns of values are the same. If the delta statistic is greater than some predetermined threshold above or below zero, e.g., three in this example, then the device can be identified as having an incorrect output power. Such an identification can lead to an operator being notified, an automatic adjustment or both. For example, the operator could be notified that device number 4 is operating outside of the established, permissible range of deltas. Then, the operator can adjust the output power of device number 4 and/or the PSVB/PSMB setting. Alternatively, this adjustment could be automated by providing feedback within the radiocommunication system as will be described below.

Figure 5:
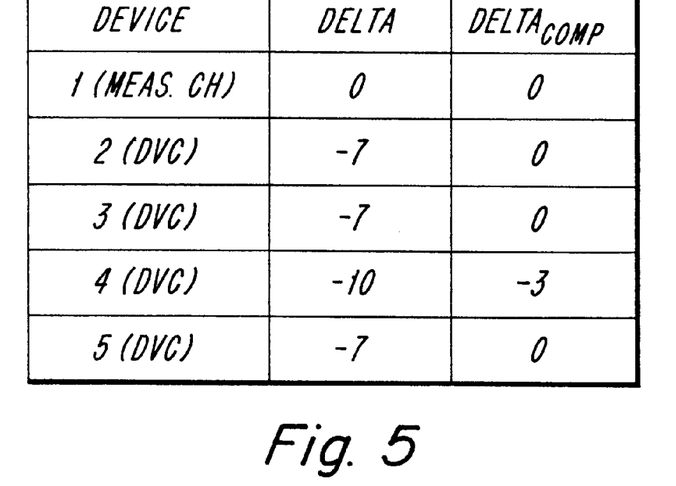

Another example of an accumulated delta statistic is illustrated in FIG. 5. For this example, unlike the example of FIG. 4, PSVB-PSMB has been set equal to −7, however those skilled in the art will recognize that this value can take any desired magnitude. Since PSVB-PSMB is not equal to zero in this example, the two different delta statistic computation techniques result in different values, but each show that device 4 is again problematic in terms of its monitored power.

As mentioned above, exemplary embodiments of the present invention provide that the delta statistic is computed based on a difference between measurements made on (1) a measurement channel (e.g., control channel) associated with a target cell and (2) a traffic channel associated with the same target cell after handoff. According to other exemplary embodiments of the present invention, the delta statistic can be computed by measuring the mobile station's current traffic channel (instead of the target cell's measurement channel) and setting delta as:

$$SS_d = Ss_t(B3) - Ss_t(B1) - \text{HYST} \quad (5)$$

As with equation (2), equation (5) can also be modified to include a PSVB-PSMB factor, if so desired.

Figure 6:
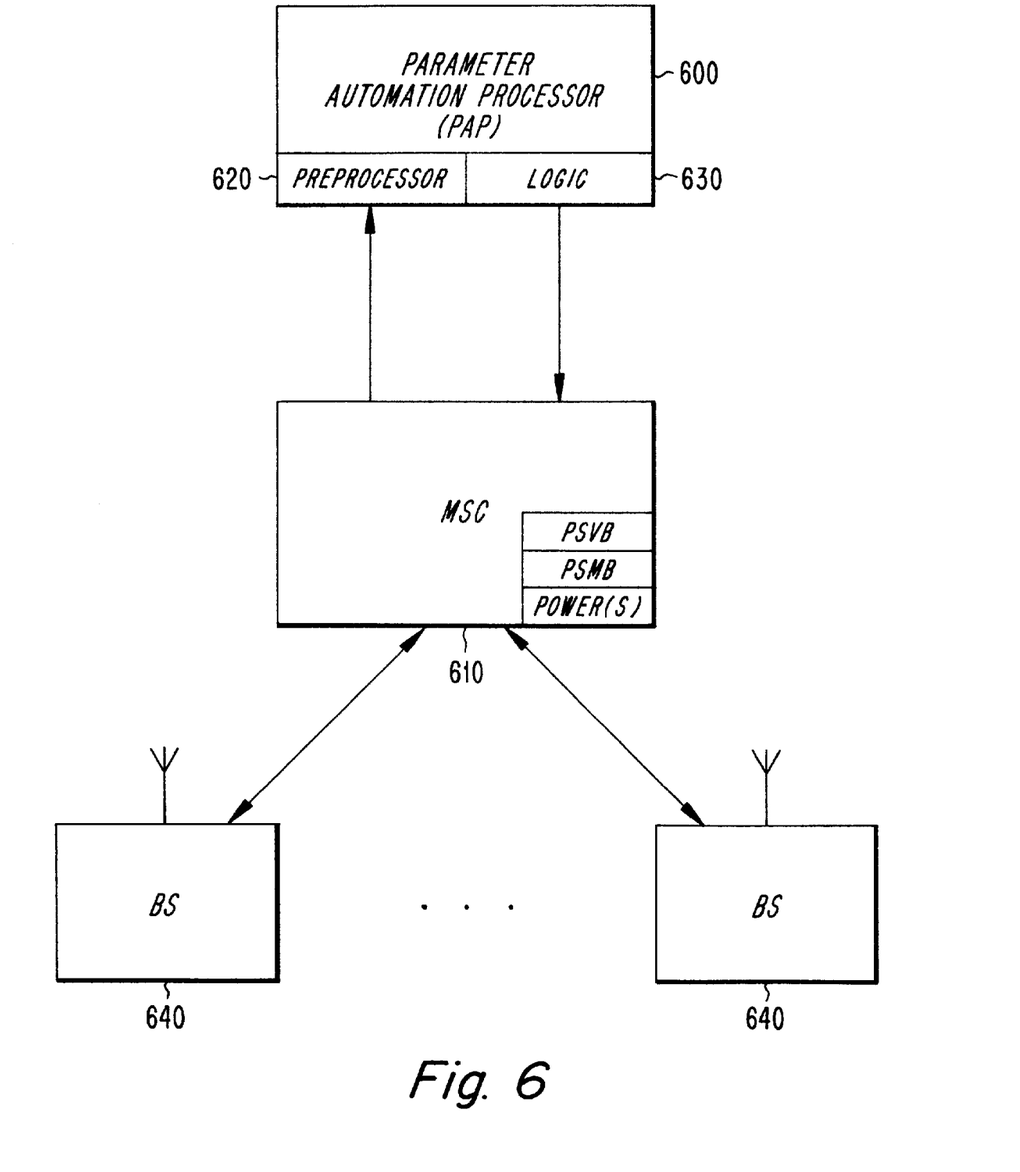
FIG. 6 depicts a processor which gathers and processes delta statistics from a radiocommunication switch.

As mentioned earlier, it may be desirable to provide automatic feedback within the radiocommunication system to implement changes to the PSVB/PSMB settings, the individual transceiver output transmit power settings or both. FIG. 6 is a block diagram illustrating how a parameter automation processor (PAP) 600 can interact with other nodes within the radiocommunication system to provide automated power output control which is responsive to the delta statistical monitoring described above.

Therein, PAP 600 periodically receives reports from MSC 610 regarding the delta statistic. These reports may take the form of raw data, e.g., individual groups of measured deltas for each transceiver, or processed data, e.g., wherein the mean or median of each group has been calculated. In any event, PAP 600 may include a preprocessor function 620 which receives the raw or processed data and formats the data or performs further calculations, e.g., takes the mean or median for each transceiver. Then, the preprocessed information can be passed to a logic function 630 within PAP 600.

The logic function 630 operates on the preprocessed delta statistics to determine whether the PSVB/PSMB and/or individual transceiver output transmit power settings stored in MSC 610 need to be updated or adjusted. Those skilled in the art will appreciate that the particular logic employed will depend upon the circumstances under which a network operator desires that a setting or output power be adjusted. Purely as an example, the following algorithm can be incorporated within logic function 630 to determine when an adjustment is needed to the PSVB setting in MSC 610.

First, logic function 630 evaluates the preprocessed delta data received from preprocessor 620 to identify a set of transceivers managed by MSC 610 having the characteristics that (1) at least 50% of the transceivers, (2) have a delta statistic that deviates less than or equal to 2 dB from the average delta ($Ss_{davg}$) of the set. Finding such a set, logic function 630 changes the PSVB setting to be equal to the previous PSVB setting plus the average delta of the set, i.e.,:

$$\text{PSVB} = \text{PSVB} + Ss_{davg}$$

This new PSVB value is then transmitted from PAP 600 to MSC 610 where it is stored and applied to the various base stations 640 controlled by that MSC. The individual transceivers' output transmit power settings can also be controlled using a similar average delta statistic processing in logic function 630. Note that although PAP 600 is shown as a separate node relative to MSC 610, it can be incorporated therein if so desired. Moreover, the changes determined within PAP 600 can be automatically implemented within the radiocommunication system, e.g., by replacing the stored value in MSC 610 with the changed value determined by PAP 600, or the changes can be selectively implemented by an intervening network operator by displaying or otherwise outputting the results of logic function 630 thereto.

Those skilled in the art will appreciate that the foregoing techniques can be used to improve handoff determinations in a variety of ways. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for monitoring output transmit power of transceivers in a radiocommunication system comprising the steps of:
   measuring a first received signal quality associated with a measurement channel being transmitted by a base station;
   measuring a second received signal quality associated with a traffic channel being transmitted by said base station;
   determining a difference between said first and second received signal qualities; and,
   using said difference to monitor an output power of a transceiver of said base station.

2. The method of claim 1, wherein said step of measuring a first received signal quality is performed by a mobile station prior to a handoff to said base station and said step of measuring said second received signal quality is performed by said mobile station after a handoff to said base station.

3. The method of claim 1, wherein said first and second received signal qualities are received signal strengths.

4. The method of claim 1, wherein said measurement channel is a control channel.

5. The method of claim 1, wherein said step of using further comprises the steps of:
   accumulating said difference with other differences calculated for said transceiver; and
   comparing said accumulated difference with a threshold.

6. The method of claim 5, further comprising the step of:
   providing an alarm indication if said accumulated difference exceeds said threshold.

7. The method of claim 5, further comprising the step of:
   adjusting an output power of said transceiver if said accumulated difference exceeds said threshold.

8. The method of claim 5, further comprising the step of:

adjusting a power difference between said measurement channel and said traffic channel if said accumulated difference exceeds said threshold.

9. A method for monitoring output transmit power of transceivers in a radiocommunication system comprising the steps of:

measuring a first received signal quality associated with a traffic channel being transmitted by a first base station;

measuring a second received signal quality associated with a traffic channel being transmitted by a second base station;

determining a difference between said first and second received signal qualities; and using said difference to monitor an output power of a transceiver of one or both of said first and second base stations.

10. The method of claim 9, wherein said step of measuring a first received signal quality is performed by a mobile station prior to a handoff to said second base station and said step of measuring said second received signal quality is performed by said mobile station after a handoff to said second base station.

11. The method of claim 9, wherein said first and second received signal qualities are received signal strengths.

12. The method of claim 9, wherein said step of using further comprises the steps of:

accumulating said difference with other differences calculated for said transceiver; and comparing said accumulated difference with a threshold.

13. The method of claim 12, further comprising the step of:

providing an alarm indication if said accumulated difference exceeds said threshold.

14. The method of claim 12, further comprising the step of:

adjusting an output power of said transceiver if said accumulated difference exceeds said threshold.

15. The method of claim 12, further comprising the step of:

adjusting a power difference between said measurement channel and said traffic channel if said accumulated difference exceeds said threshold.

16. An apparatus for monitoring output transmit power of transceivers in a radiocommunication system comprising:

a switch for coordinating the operation of said transceivers and storing parameters associated with controlling said output power of said transceivers; and a processor for:
(a) receiving, from said switch, signal quality difference information associated with handoff,
(b) processing said received signal quality difference information using at least one logic function, and
(c) returning a changed value to at least one of said stored parameters.

17. The apparatus of claim 16, wherein said signal quality difference information further comprises:

a difference between a first signal strength measured on a first traffic channel prior to a handoff and a second signal strength measured on a second traffic channel after said handoff.

18. The apparatus of claim 16, wherein said signal quality difference information further comprises:

a difference between a first signal strength measured on a control channel prior to a handoff and a second signal strength measured on a traffic channel after said handoff.

19. The apparatus of claim 16, wherein said switch controls a plurality of transceivers and said stored parameters include a relative power difference between traffic channels and control channels, which relative power difference applies to a group of said plurality of transceivers associated with a particular base station.

20. The apparatus of claim 16, wherein said switch controls a plurality of transceivers and said stored parameters include an output transmit power setting associated with each individual transceiver.

21. The apparatus of claim 16, wherein said processor is co-located with said switch.

22. The apparatus of claim 16, further comprising:

means for outputting said changed value to a network operator.

23. The apparatus of claim 16, further comprising:

means for replacing a stored parameter in said switch with said changed value.

* * * * *